(12) United States Patent
Øvrebø et al.

(10) Patent No.: US 11,577,863 B2
(45) Date of Patent: Feb. 14, 2023

(54) COMPACT SYSTEM FOR PACKAGING MICROFIBRILLATED CELLULOSE

(71) Applicant: Borregaard AS, Sarpsborg (NO)

(72) Inventors: Hans Henrik Øvrebø, Sarpsborg (NO); Antje Gonera, Vestby (NO); Jarle Wikeby, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 131 days.

(21) Appl. No.: 16/644,952

(22) PCT Filed: Sep. 18, 2018

(86) PCT No.: PCT/EP2018/075233
§ 371 (c)(1),
(2) Date: Mar. 5, 2020

(87) PCT Pub. No.: WO2019/057726
PCT Pub. Date: Mar. 28, 2019

(65) Prior Publication Data
US 2021/0163161 A1    Jun. 3, 2021

(30) Foreign Application Priority Data
Sep. 19, 2017 (EP) .................................... 17191952

(51) Int. Cl.
*B65B 9/06*        (2012.01)
*B65B 3/08*        (2006.01)
(Continued)

(52) U.S. Cl.
CPC ................. *B65B 9/06* (2013.01); *B65B 3/08* (2013.01); *B65B 13/34* (2013.01); *B65D 75/48* (2013.01); *D21H 11/18* (2013.01)

(58) Field of Classification Search
CPC .. B65B 9/06; B65B 3/00; B65D 75/40; B65D 75/42; B65D 75/44; B65D 75/46; B65D 75/48
See application file for complete search history.

(56) References Cited

U.S. PATENT DOCUMENTS 4,341,807 A    7/1982  Turbak et al.
4,374,702 A    2/1983  Turbak et al.
(Continued)

FOREIGN PATENT DOCUMENTS

EP         2494107 A1      9/2012
WO    WO-2007/091942 A1   8/2007
(Continued)

OTHER PUBLICATIONS

International Search Report for PCT/EP2018/075233, 2 pages (dated Nov. 7, 2018).
(Continued)

*Primary Examiner* — Chelsea E Stinson
(74) *Attorney, Agent, or Firm* — Choate, Hall & Stewart LLP; William R. Haulbrook; Michael D. Schmitt

(57) ABSTRACT

The present invention relates to a system for the compact packaging of microfibrillated cellulose, which comprises a packaging, which comprises at least one polymer material. Said packaging encompasses a content that essentially consists of microfibrillated cellulose ("MFC") that is present as a suspension in a solvent. The resulting system is of an essentially round or essentially rectangular or oval outer circumference, as defined by the dimensions of the packaging once fully filled out by the content. The system of the invention has the advantage, among others, to provide a solid and firm essentially round packaging shape. The resulting units of packaged MFC can be easily stacked on a pallet. The packaging maintains the water retention capacity of the (Continued)

Figure 1:
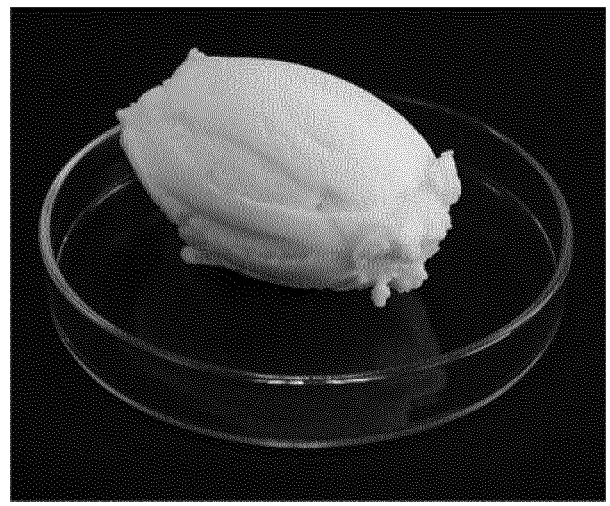

suspension (paste). The present invention also relates to a process for making such a system.

14 Claims, 3 Drawing Sheets

(51) Int. Cl.
 *B65B 13/34* (2006.01)
 *B65D 75/48* (2006.01)
 *D21H 11/18* (2006.01)

(56) References Cited

U.S. PATENT DOCUMENTS

| | | | |
|---|---|---|---|
| 4,481,077 A | 11/1984 | Herrick | |
| 2005/0041893 A1* | 2/2005 | Hartmann | B29C 66/729 |
| | | | 383/117 |
| 2009/0025741 A1* | 1/2009 | Crawford | B65D 75/40 |
| | | | 156/60 |

FOREIGN PATENT DOCUMENTS

| | | | | |
|---|---|---|---|---|
| WO | WO-2014/029909 A1 | 2/2014 | | |
| WO | WO-2014/106684 A1 | 7/2014 | | |
| WO | WO-2015/082774 A1 | 6/2015 | | |
| WO | WO-2015082774 A1 * | 6/2015 | | C08B 11/00 |
| WO | WO-2015/180844 A1 | 12/2015 | | |
| WO | WO-2019/057726 A1 | 3/2019 | | |

OTHER PUBLICATIONS

Written Opinion for PCT/EP2018/075233, 7 pages (dated Nov. 7, 2018).

* cited by examiner

COMPACT SYSTEM FOR PACKAGING MICROFIBRILLATED CELLULOSE

FIELD OF THE INVENTION

The present invention relates to a system for the compact packaging of microfibrillated cellulose.

Microfibrillated cellulose is typically commercialized as a paste-like suspension that cannot be easily emptied out of a container. The system of the present invention comprises a packaging, which comprises at least one polymer material. Said packaging encompasses a content that essentially consists of microfibrillated cellulose ("MFC") that is present as a suspension in a solvent. The microfibrillated cellulose has a solids content of from 2% dry matter to 50% dry matter in the solvent (i.e. weight MFC relative to overall weight, i.e. "w/w" as given in %), preferably from 3% to 30%, further preferably 5% to 12%. The resulting system is of an essentially round, essentially rectangular, or oval outer circumference, as defined by the dimensions of the packaging once fully filled out by the content.

The system of the invention has the advantage, among others, to provide a solid and firm packaging shape that is essentially round, or essentially rectangular or oval. The resulting units of packaged MFC can be easily stacked on a pallet. The packaging maintains the water retention capacity of the suspension (paste).

The present invention also relates to a process for making such a system.

BACKGROUND OF THE INVENTION

Microfibrillated cellulose (also known as "reticulated" cellulose or as "superfine" cellulose, or as "cellulose nanofibrils", among others and also referred to as "MFC" in the following) is a cellulose-based product and is described, for example, in U.S. Pat. Nos. 4,481,077, 4,374,702 and 4,341,807. According to U.S. Pat. No. 4,374,702 ("Turbak"), microfibrillated cellulose has reduced length scales (diameter, fiber length) vis-à-vis cellulose, improved water retention and adjustable viscoelastic properties. MFC with further improved properties and/or properties tailor-made for specific applications is known, among others, from WO 2007/091942 and WO 2015/180844.

After manufacture, microfibrillated cellulose as ready for transportation to customers is typically present as a "paste", i.e. as a suspension of solid microfibrillated fibers in a solvent, typically in water. Dewatered microfibrillated cellulose with a dry content (solids content) of typically 8-15% is challenging to handle. The paste (suspension) is neither a liquid nor a solid, but rather is a paste and has non-Newtonian flow properties (see FIG. 1 for a photograph of non-contained microfibrillated cellulose as dewatered to a solids content of 8-12%).

WO 2014/029909 discloses a process for conditioning microfibrillated cellulose so that the microfibrillated cellulose can be more easily transported in dried form and then rewetted and further disintegrated at a different location. WO 2014/106684 discloses that pulp obtained after refining can be further dewatered e.g. for transportation and then diluted to a suitable consistency before use.

Conventional packaging, like plastic bags, buckets or drums has proven to not be ideal for containing larger volumes/quantities of microfibrillated cellulose. While microfibrillated cellulose may be filled into various kinds of containers, it is comparatively difficult and resource demanding to empty containers typically used for the transport of solids or liquids, such as bins, bags or cans.

MFC may be filled into plastic bags, in principle, which are comparatively easy to empty, but the bags are impossible to stack due to "air pockets" that typically form in the bag. The presence of such air pockets causes problems when attempting to stack filled bags on a pallet. In particular during storage and transportation, such bags will adopt different shapes, thus making transport difficult, if not impossible.

Based on the above, it is an object of the present invention to provide a compact packaging specifically for microfibrillated cellulose, which is present as a "paste", wherein said packaging should avoid or minimize any or all of the disadvantages as outlined above.

SUMMARY OF THE PRESENT INVENTION

The inventors have surprisingly found that it is possible to package microfibrillated cellulose (MFC) suspensions having a dry matter (solids) content of from 2% weight/weight ("w/w") to 50% w/w, preferably of from 3% w/w to 30% w/w, further preferably from 5% w/w to 12% w/w in a manner so that the performance characteristics of microfibrillated cellulose do not (noticeably) deteriorate, as they may in conventional packaging, for example simple filling into a plastic sack.

In accordance with a first aspect of the present invention, the above-recited problem(s) and others is/are solved by a system comprising:
- at least one packaging that comprises at least one polymer material;
- a content of the packaging that is fully encompassed by the packaging, wherein said content essentially consists of microfibrillated cellulose that is present in at least one solvent;

wherein the microfibrillated cellulose and the solvent form a suspension of microfibrillated cellulose in said solvent, wherein the solids content of microfibrillated cellulose in relation to the overall weight of the suspension is from 2% weight/weight ("w/w") to 50% w/w, preferably of from 3% w/w to 30% w/w, further preferably from 5% w/w to 12% w/w, wherein the packaging, when entirely filled out with the content, defines an outer circumference of the overall system, i.e. of the packaged microfibrillated cellulose, that is essentially round or essentially rectangular, or of oval shape, and wherein the length of said system is at least 1.5 times, preferably at least 3 times, further preferably at least 4 times the largest width defining the cross-section of said (essentially round, oval or rectangular) circumference.

In accordance with the present invention, the term "suspension" is understood to mean a liquid, in which solid particles (here: fibers) are dispersed, as generally understood by the skilled person and as defined in the IUPAC "Gold Book", [PAC, 1972, 31, 577 (*Manual of Symbols and Terminology for Physicochemical Quantities and Units, Appendix II: Definitions, Terminology and Symbols in Colloid and Surface Chemistry*); page 606].

In the present invention, the suspension of microfibrillated cellulose fibers in a solvent, has the consistence of a "paste" and shows non-Newtonian flow properties (see FIG. 1). Such a suspension/paste is sometimes also referred to as a "gel" (or "hydrogel" if the solvent is water)

In accordance with the present invention, the parameter "dry matter" (also known as "solids content") refers to the amount of MFC that remains once all the solvent (typically water) has been removed and is provided in % weight relative to the overall weight of the suspension comprising MFC and the solvent.

In accordance with the present invention, the "solids content" of microfibrillated cellulose in solvent is measured by oven drying (105° C., 16 hours). At least 30 g of sample is weighed into a pre-weighed aluminum weighing dish. The sample is then dried at 105° C. for 16 hours. The aluminum weighing dish with the dried matter is weighed, and dry matter is calculated based on the formula: [Weight (dish plus sample after drying)−Weight (dish)*100%]/Weight (sample before drying)

Unless indicated otherwise, any parameter referred to in the present disclosure is measured at standard conditions, i.e. at room temperature (20° C.), ambient pressure (1 bar) and 50% ambient humidity.

Unless indicated otherwise, any ratio given for an amount of component of the overall system is meant to be given in % weight relative to the overall weigh of the content of the system (i.e. excluding packaging).

In accordance with the present invention, the requirement that the content is "encompassed" by the packaging is understood to mean that the entire content, i.e. the MFC as present as paste/suspension/gel is contained in the packaging and is present in an amount that is sufficient so that the packaging, which is essentially non-stretchable, almost non-stretchable or partly stretchable, adopts the predetermined final outer dimension that can be maximally achieved, without rupturing or otherwise compromising the structural integrity of the packaging.

Figure 2:

The packaging encompassing the content is closed in regard to at least one opening, i.e. the packaging can be oriented in line with the direction of gravity without any loss of the content In the final realization for transport, the packaging encompassing the content is closed in regard to both (or all, if more than two openings are present) openings/ends (see FIG. 2, right panel for a depiction of such a final realization of the invention)

In embodiments of the invention, the packaging is a tubing or tube-shaped, i.e. has an essentially round outer circumference and is longer by a factor of at least 1.5, preferably at least 3 times, further preferably at least 4 times than it is wide (length "l">diameter "d").

In accordance with the invention, the packaging comprises at least one polymer material, preferably two or more different polymer materials.

In embodiments of the present invention, the at least one polymer is not an elastomer and the packaging is realized as a (composite) film.

In embodiments of the invention, said film has a thickness of from 50 µm to 5 mm, preferably from 100 µm to 2 mm, further preferably from 100 µm to 500 µm.

In embodiments of the invention, the packaging, realized as a film, composite or otherwise, has an tensile strength as measured in accordance with the standard ASTM D882-02 (published June 2002) in the range of from 5 MPa to 500 MPa, preferably from 20 MPa to 300 MPa.

No restrictions apply in regard to the at least one polymer material [or any combination of two or more such materials, or at least one polymer material in combination with any other suitable (non-polymer) material], as long as the suitable tensile strength, elongation and/or tensile modulus of the packaging is achievable.

Also, no restrictions exist in regard to the kind of polymer material (or of the polymer materials or of any composite comprising at least one polymer), as long as the packaging is capable to contain MFC under typical storage and transport conditions. Also, no limitation exists in regard to the number of layers, polymer or otherwise (e.g. metal or fiber) making up the packaging.

In embodiments of the invention, the at least one polymer is selected from polymers used in food packaging and non-food packaging applications. Preferred polymers therefore include polyethylene, in particular HDPE, LDPE and LLDPE (see more detailed discussion below), polypropylene, polycarbonate, PET, and any combination thereof, or any combination with other materials, such as fibers, metal coatings/foils etc.

No restrictions apply in regard to the dimension of the packaging that is achieved once the packaging, preferably the tube-shaped packaging film is filled with MFC paste (content) so that dimensional stability is achieved (see FIG. 2 for a representation of such a dimensionally stable system).

In embodiments of the invention, the diameter of the system, i.e. the diameter and/or the largest dimension defining the cross-section of the packaging encompassing (and including) the MFC paste is from 2 cm to 50 cm, preferably from 5 cm to 30 cm, further preferably from 10 cm to 25 cm.

In embodiments of the invention, the weight of the system, i.e. one individual tube-like structure holding MFC paste, is from 1 kg to 50 kg, preferably from 2 kg to 20 kg, per unit.

In accordance with the present invention, the requirement that the content of the system "essentially consists of" MFC is understood to mean that the content must comprise at least 90% by weight (relative to the overall weight of the content) of MFC, preferably at least 95% by weight, further preferably at least 99% by weight of MFC, i.e. microfibrillated cellulose fibers as suspended in a solvent, i.e. the paste or gel as described above.

No limitations exist in regard to the solvent, as long as the solvent is capable to keep the MFC fibers in suspension under conditions typical for storage and transport.

In embodiments of the invention, the solvent is a hydrophilic solvent, preferably a polar solvent, further preferably a protic solvent. Preferred solvents are water or alcohol or any mixture of such solvents.

In preferred embodiments the solvent essentially consists of water, i.e. comprises at least 90%, preferably at least 95%, further preferably at least 99% of water. "Water" can be distilled water, processed water or tab water as commonly used in industrial applications.

In accordance with the present invention, the term "essentially round" is understood to mean that the overall circumference of the system (packaging filled with content until the packaging has reached its maximum outer dimensions, without rupturing or being otherwise compromised) is described by a circle, wherein the deviation from an ideal circle [as described by $(\pi r^2)$] is not more than 10%, preferably not more than 5%, in regard to the relative difference between the major and the minor axis of an ellipsoidal circumference (apparently, this difference is 0% for an ideal circle, wherein major and minor axis are identical and correspond to the radius r).

Accordingly "oval" means that a major and a minor axis exist that are different from each other, but no more than 30%, preferably no more than 20%.

Accordingly, the term "essentially rectangular" is understood to mean that the overall circumference of the system (packaging filled with content until the packaging has reached its maximum outer dimensions, without rupturing or being otherwise compromised) is described by a rectangle, wherein the deviation from an ideal rectangle is not more than 10%, preferably not more than 5%, in regard to a curvature of any of the sides of a rectangle and/or in regard to any angle of the rectangle.

In a preferred embodiment, the essentially rectangular cross-section is essentially square.

The "round" or oval or "rectangular" or "square" geometry of the overall system, as defined by the packaging and the microfibrillated cellulose adapting thereto is advantageous for the working of the present invention, since those "rolls" or "bricks" can then be stacked and stably packaged further, for example in boxes and/or on pallets.

Furthermore, the inventors have found that, in addition to providing a solid and firm packaging shape, the water retention capacity of the microfibrillated cellulose remains essentially unchanged when the microfibrillated cellulose is packaged in accordance with the present invention, since the compact packaging (equal pressure from all sides) stabilizes the microfibrillated cellulose and avoids sedimentation and/or separation effects. By contrast, upon storage in an ordinary plastic bag, droplets of water will be visible after short period of time, i.e. the MFC fails to retain its water retention capacity.

Without wishing to be bound by theory, it is believed that, among others, the extrusion process as used during packaging, and in accordance with the present invention, further stabilizes and homogenizes the MFC. Therefore, with this inventive packaging, the water retention properties of the MFC are by-and-large retained, as opposed to other known storage and transportation systems.

In accordance with the present invention, the system may comprise further components in addition to the packaging and the content, for example one or more label(s) or a coding or any further (secondary) packaging.

"Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

In cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibers. In cellulose (pulp), elementary fibrils are aggregated into microfibrils which are further aggregated into larger fibril bundles and finally into cellulosic fibres. The diameter of wood based fibres of the cellulose pulp is typically in the range 10-50 μm (with the length of these fibres being even greater). When the cellulose fibres are microfibrillated, a heterogeneous mixture of "released" fibrils with cross-sectional dimensions and lengths from nm to μm may result. Fibrils and bundles of fibrils may co-exist in the resulting microfibrillated cellulose.

In the microfibrillated cellulose ('MFC') as described throughout the present disclosure, individual fibrils or fibril bundles can be identified and easily discerned by way of conventional optical microscopy, for example at a magnification of 40×.

In accordance with a second aspect, all or some of the above recited problems are solved by a process for the packaging of microfibrillated cellulose, wherein said process comprises at least the following steps:

providing a packaging that comprises at least one polymer material and that is, if filled with content to its intended maximum outer dimensions, of an essentially round or oval or essential rectangular circumference, and that has a length dimension essentially perpendicular to the area defined by said circumference that is at least 1.5 times said length dimension, preferably at least 3 times, further preferably at least 4 times said length dimension;

extruding microfibrillated cellulose from an extruder into said packaging until the packaging is filled with microfibrillated cellulose, in its entirety, so that the package achieves its intended outer dimension.

In embodiments of the invention, said process results in a system according to any of the embodiments disclosed above:

In embodiments of the invention, the process comprises at least the following further step(s)

closing the packaging, on all ends, after having filled the packaging with MFC so that dimensional stability is achieved, so that the resulting system not only retains dimensional stability under typical conditions of transport and/or storage, but also retains the content under said typical conditions of transport and/or storage.

prior to extruding the MFC from an extruder: charging the MFC suspension into a vacuum filler device in order to further homogenize the suspension (paste).

Figure 3:
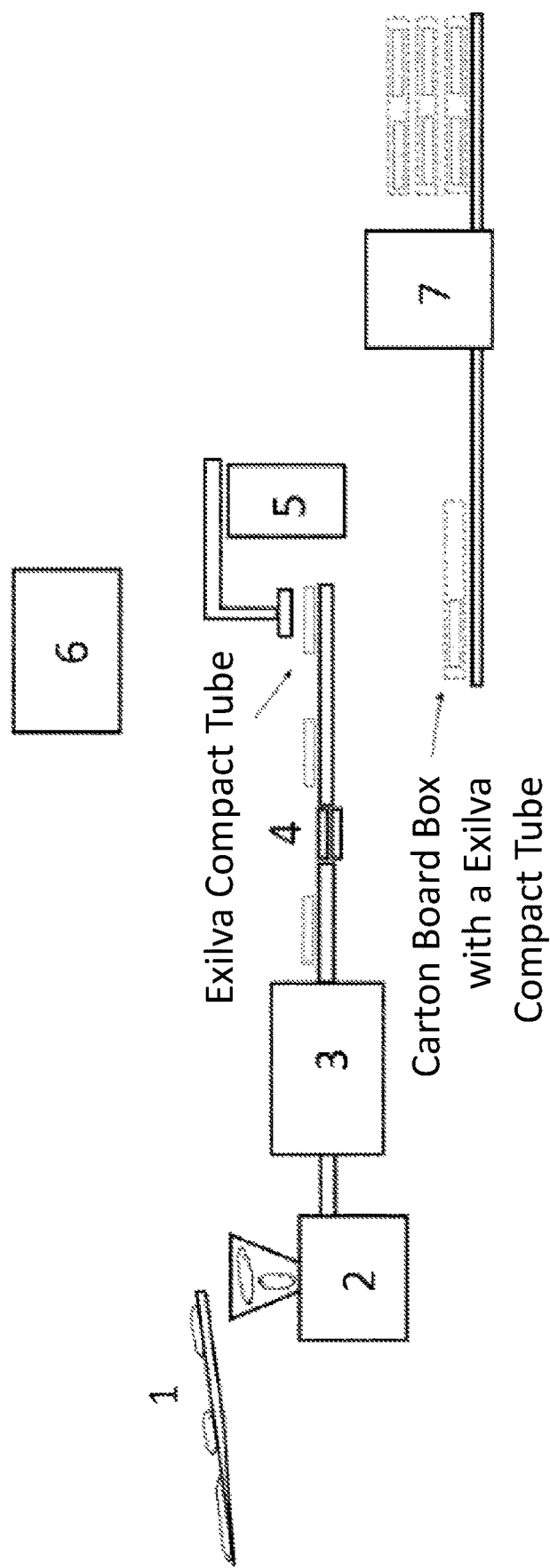

FIG. 3 illustrates an exemplary process for filling the packaging with MFC paste.

In step 1, MFC paste is transported by conveyer(s) from the final de-watering step of a process for making MFC based on cellulose pulp. This MFC is then transported to a pump and/or an extruder.

The MFC may be transported in portions (as shown in FIG. 3) or may be transported continuously. Other suitable means (other than a conveyor) may be used in step 1.

In step 2, preferably in an extruder, the MFC is further mixed, homogenized and extruded through a nozzle and into the packaging, preferably at a constant rate.

No limitations exist in regard to the extruder and any extruder that is suitable to process a paste of the consistency and the viscosity of MFC may be used. As an example, any extruder/pump system as commercially available from Karl Schnell company may be used, in particular the KS pump system that is based on the principle of the positive displacement pump, i.e. any vacuum filling system. This design is particularly suitable for highly viscous products.

Hence, in embodiments of the invention, the extruder is or comprises a vacuum filling unit.

In embodiments of the invention, the entire pump is evacuated during the extrusion process.

In step 3, preferably in a clipping machine, the tube-shaped packaging (including the MFC as content) is closed, preferably with two clips at each end of the tube.

Conveyors are used for transport between the different stations [step (4) in FIG. 3]. The entire process is preferably fully automated.

Optional devices used in the process are a labelling device (5) for labeling each tube, for example with batch number, product type, manufacturing date etc., a case erector (7) for the corrugated board or cardboard boxes for transport, as well as a palleting machine for packaging corrugated board or cardboard boxes onto pallets.

In embodiments of the invention, robots (6) are used to lift filled tubes into carton board boxes and/or to lift corrugated board or cardboard boxes. "Single boxes" (one tube) or "multiple boxes" (>2-3 tubes) may be lifted.

In accordance with a third aspect of the present invention, all or some of the above recited problems are solved by using a system as described in any of the embodiments above for storage and/or transport of MFC.

DETAILED DESCRIPTION OF THE INVENTION

The invention is described in more detail in the following, with reference to the enclosed figures, which are only meant to be illustrative, wherein:

FIG. 1 shows microfibrillated cellulose at a dry matter content of approx. 8% to 12%; the "paste"-like structure is apparent FIG. 2 shows MFC as packaged in accordance with the present invention (right panel); even after removing the packaging, the MFC keeps its dimensional stability; no loss of water is observed (left panel)

FIG. 3 shows a schematic depiction of a line and process for filling MFC into the packaging of the present invention As already indicated above, the at least one polymer used in the packaging of the present system may be selected from polymers used in food packaging and non-food packaging applications. Preferred polymers therefore include polyethylene, in particular HDPE, LDPE and LLDPE, polypropylene, polycarbonate, PET, and any combination thereof, or any combination with other materials, such as fibers, metal coatings/foils etc.

Low density polyethylene or LDPE is a thermoplastic packaging that is easy to process, and that may be blended with other polymers and/or additives, like EVA, HDPE, LLDPE, fillers, pigments to alter its basic properties.

Linear low-density polyethylene (LLDPE) has similar properties as LDPE but has higher tensile and impact strength and better heat sealability, whereas LDPE provides higher clarity, ease of processing and higher gloss.

Metallocene polyethylene or mPE is a low density polyethylene which is made by utilizing a metallocene catalyst. This technology allows for rapid sealing. The resulting packaging has excellent puncture resistance and permeability to oxygen and good tensile strength at break and is much stronger than ordinary polyethylene.

High density polyethylene or HDPE is a milky white, semi-translucent thermoplastic that is flexible but more rigid and stronger than LDPE and has good impact strength and superior puncture resistance. HDPE is stiffer than other polyethylene films, which is an important characteristic for packages that need to maintain their shape.

Polypropylene or PP is a thermoplastic of high clarity, high gloss and good tensile strength. The two most important types of PP are cast unoriented polypropylene (CPP) and biaxially oriented polypropylene (BOPP). Both types have high gloss, exceptional optics, good or excellent heat sealing performance, high heat resistance, and good dimensional stability. In general, CPP has higher tear and impact resistance, better cold temperature performance and better gas barrier and heat-sealing properties, whereas BOPP has the higher tensile strength, higher modulus (stiffness), lower elongation, and lower haze.

Polycarbonate (PC) is an amorphous engineering thermoplastic which has excellent mechanical, optical, electrical, and thermal properties. It is extremely tough and has outstanding impact resistance and high optical clarity. PC films are used for film applications that require high scratch, chemical, and weathering resistance and high crystal clear transparency.

Vinyl film also known as polyvinyl chloride, or PVC is a versatile, cheap thermoplastic of good dimensional stability, good impact strength, and excellent weathering properties that can be easily die-cut and that is printable with conventional screen and offset printing methods.

Polyester film is a high-performance, crystal clear thermoplastic made from polyethylene terephthalate (PET). In comparison with other common plastic films, PET film has high tensile strength, excellent dimensional stability, low moisture absorption, and good retention of physical properties over a fairly wide temperature range.

Polyvinylidene chloride (PVDC) is a synthetic thermoplastic produced by the polymerization of vinylindene chloride. The most common type is biaxial oriented film. PVDC has outstanding oxygen and moisture barrier properties and is also printable using common ink systems and provides excellent bond strength, high heat resistance, and low water absorption.

Polyamide (PA), also known as Nylon, is a clear and printable thermoplastic that has a relatively high melting point, exceptional strength and toughness, and good oxygen barrier properties. The two most common types are cast and biaxial oriented Nylon film. Biaxial oriented polyamide or BOPA film can be used for a wide variety of applications especially where high gas barrier properties are required.

As already indicated above, in principle, any type of microfibrillated cellulose (MFC) can be used for the content of the packaging as used in accordance with the present invention, as long as the fiber bundles as present in the original cellulose pulp are sufficiently disintegrated in the process of making MFC so that the average diameter of the resulting fibers/fibrils is in the nanometer-range and therefore more surface of the overall cellulose-based material has been created, vis-à-vis the surface available in the original cellulose material. MFC may be prepared according to any of the processes described in the art, including the prior art specifically cited in the "Background"-Section above.

Origin of the Cellulose Used to Prepare the MFC

In accordance with the present invention, there is no specific restriction in regard to the origin of the cellulose, and hence of the microfibrillated cellulose. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g. from tunicates.

In a preferred embodiment, wood-based materials are used as raw materials, either hardwood or softwood or both (in mixtures). Further preferably softwood is used as a raw material, either one kind or mixtures of different soft wood types. Bacterial microfibrillated cellulose is also preferred, due to its comparatively high purity.

Modified (Derivatized) and Non-Modified (Un-Derivatized) Cellulose/MFC

In principle, the microfibrillated cellulose in accordance with the present invention may be unmodified in respect to its functional groups or may be physically modified or chemically modified, or both.

Chemical modification of the surface of the cellulose microfibrils may be achieved by various possible reactions of the surface functional groups of the cellulose microfibrils and more particularly of the hydroxyl functional groups, preferably by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

The cellulose microfibrils may, in principle, also be modified by a physical route, either by adsorption at the surface, or by spraying, or by coating, or by encapsulation of the microfibril. Preferred modified microfibrils can be obtained by physical adsorption of at least one compound. The MFC may also be modified by association with an amphiphilic compound (surfactant).

However, in preferred embodiments, the microfibrillated cellulose is not physically modified.

In a preferred embodiment of the present invention, the microfibrillated cellulose is prepared by a process, which comprises at least the following steps:
  (a) subjecting a cellulose pulp to at least one mechanical pretreatment step;
  (b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose;
  wherein the homogenizing step (b) involves compressing the cellulose pulp from step (a) and subjecting the cellulose pulp to a pressure drop.

The mechanical pretreatment step preferably is or comprises a refining step. The purpose of the mechanical pretreatment is to "beat" the cellulose pulp in order to increase the accessibility of the cell walls, i.e. to increase the surface area.

A refiner that is preferably used in the mechanical pretreatment step comprises at least one rotating disk. Therein, the cellulose pulp slurry is subjected to shear forces between the at least one rotating disk and at least one stationary disk.

Prior to the mechanical pretreatment step, or in addition to the mechanical pretreatment step, enzymatic (pre)treatment of the cellulose pulp is an optional additional step that may be preferred for some applications. In regard to enzymatic pretreatment in conjunction with microfibrillating cellulose, the respective content of WO 2007/091942 is incorporated herein by reference. Any other type of pretreatment, including chemical pretreatment is also within the scope of the present invention.

In the homogenizing step (b), which is to be conducted after the (mechanical) pretreatment step, the cellulose pulp slurry from step (a) is passed through a homogenizer at least once, preferably at least two times, as described, for example, in PCT/EP2015/001103, the respective content of which is hereby incorporated by reference.

EXAMPLES

Example 1

Preparation of Microfibrillated Cellulose

MFC as used in the system/packaging of the present invention is commercially available and commercialized by Borregaard as "Exilva F01-V", based on cellulose pulp from Norwegian spruce (softwood).

The MFC in step (i) was present as a paste, having a solids content of 10%. The solvent was water.

Example 2

Packaging of Microfibrillated Cellulose

FIG. 3 illustrates an exemplary process for filling the packaging with MFC paste from Example 1.

In step 1, said MFC paste is transported by conveyer(s) from the final de-watering step of a process for making MFC out of cellulose pulp. This MFC is then transported to an extruder. The MFC was transported in portions (as shown in FIG. 3).

In step 2, the MFC is further mixed, homogenized and extruded through a nozzle and into the packaging, at a constant rate. The extruder was a KS Pump System (vacuum filler) as commercialized by Karl Schnell. Without wishing to be bound by theory, it is believed that the extrusion process as used during packaging, and in accordance with the present invention, further stabilizes and homogenizes the MFC. Therefore, with this inventive packaging, the water retention properties of the MFC are by-and-large retained, as opposed to other known storage and transportation systems.

In step 3, in a clipping machine, the tube-shaped packaging (including the MFC as content) is closed, with two clips at each end of the tube.

Conveyors are used for transport between the different stations [step (4) in FIG. 3]. The entire process is fully automated.

Further devices used in the process are a labelling device (5) for labeling each tube, for example with batch number, product type, manufacturing date etc., a case erector (7) for the corrugated board or cardboard boxes for transport, as well as a palleting machine for packaging the corrugated board or cardboard boxes on pallets.

Robots (6) are used to lift filled tubes into carton board boxes and/or to lift the corrugated board or cardboard boxes.

Overall, many successful trials have been executed with an extruder that homogenize and fill the packaging with MFC.

FIG. 2 shows that the product is completely homogenized after the packaging has been removed.

The invention claimed is:
1. A system comprising:
  a packaging that comprises at least one polymer material;
  a content of the packaging that is fully encompassed by the packaging, wherein said content essentially consists of microfibrillated cellulose that is present in at least one solvent;
  wherein the microfibrillated cellulose and the at least one solvent form a suspension of microfibrillated cellulose in said at least one solvent,
  wherein a solids content of microfibrillated cellulose in relation to an overall weight of the suspension is from 2% weight/weight to 50% w/w, wherein the packaging, when entirely filled out with the content, defines an outer circumference of the system that is essentially round or essentially rectangular, or of oval shape, and
  wherein a length of said system is at least 1.5 times a largest width defining a cross-section of said circumference,
  wherein the packaging is filled with the content in its entirety, and
  wherein a weight of the system is from 1 kg to 50 kg per unit,
  wherein the packaging has a tensile strength as measured in accordance with the standard ASTM D882-02, published June 2002, in a range of from 5 MPa to 500 MPa.

2. The system according to claim 1 wherein the packaging is essentially round and preferably is a tubing or tube-shaped.

3. The system according to claim 1 wherein the at least one polymer is not an elastomer.

4. The system according to claim 1, wherein the packaging is realized as a film.

5. The system of claim 4, wherein the film has a thickness of from 50 µm to 5 mm.

6. The system according to claim 1, wherein the at least one polymer of the packaging is selected from polymers used in food packaging and non-food packaging applications and include at least one of the following: polyethylene, polypropylene, polycarbonate, PET, any combination thereof, or any combination with other materials.

7. The system according to claim 1, wherein a diameter of the system is from 2 cm to 50 cm.

8. The system of claim 7, wherein the diameter is from 5 cm to 30 cm.

9. The system according to claim 1, wherein the at least one solvent essentially consists of water.

10. The system of claim 1, wherein the microfibrillated cellulose has been prepared by a process, which comprises at least the following steps:

(a) subjecting a cellulose pulp to at least one mechanical pretreatment step;

(b) subjecting the mechanically pretreated cellulose pulp of step (a) to a homogenizing step, which results in fibrils and fibril bundles of reduced length and diameter vis-a-vis the cellulose fibers present in the mechanically pretreated cellulose pulp of step (a), said step (b) resulting in microfibrillated cellulose;

wherein the homogenizing step (b) involves compressing the cellulose pulp from step (a) and subjecting the cellulose pulp to a pressure drop.

11. The system of claim 1, wherein the solids content of microfibrillated cellulose in relation to the overall weight of the suspension is from 5% w/w to 12% w/w.

12. The system of claim 1, wherein the length of said system is at least 3 times the largest width.

13. The system of claim 1, wherein the packaging has a tensile strength as measured in accordance with the standard ASTM D882-02, published June 2002, in a range of from 20 MPa to 300 MPa.

14. The system of claim 1, wherein the at least one solvent comprises at least 90% water.

* * * * *